US012706426B2

(12) United States Patent
Tang et al.

(10) Patent No.: US 12,706,426 B2
(45) Date of Patent: Aug. 11, 2026

(54) METHOD FOR FORMING A CONNECTION BETWEEN A BUSBAR AND A CONTACT SECTION, A BUSBAR HAVING A CONTACT SECTION AND POWER DISTRIBUTION SYSTEM HAVING SUCH BUSBAR

(71) Applicant: Rogers BV, Evergem (BE)

(72) Inventors: Liang Tang, Suzhou (CN); Wei Shi, Suzhou (CN); Liting Wang, Evergem (BE)

(73) Assignee: ROGERS BV, Evergem (BE)

( * ) Notice: Subject to any disclaimer, the term of this patent is extended or adjusted under 35 U.S.C. 154(b) by 887 days.

(21) Appl. No.: 17/927,433

(22) PCT Filed: Mar. 23, 2021

(86) PCT No.: PCT/EP2021/057344
§ 371 (c)(1),
(2) Date: Nov. 23, 2022

(87) PCT Pub. No.: WO2021/239288
PCT Pub. Date: Dec. 2, 2021

(65) Prior Publication Data

US 2023/0208089 A1 Jun. 29, 2023

(30) Foreign Application Priority Data

May 26, 2020 (EP) .................................... 20176402

(51) Int. Cl.
*H01R 43/02* (2006.01)
*B23K 26/06* (2014.01)
(Continued)

(52) U.S. Cl.
CPC ..... *H01R 43/0221* (2013.01); *B23K 26/0619* (2015.10); *B23K 26/24* (2013.01);
(Continued)

(58) Field of Classification Search
CPC ...... B23K 26/322; B23K 26/24; B23K 26/26; H02G 5/005; H01R 4/029; H01R 43/0221
(Continued)

(56) References Cited

U.S. PATENT DOCUMENTS 4,315,175 A * 2/1982 Hamilton ............... H02K 15/30 228/115
8,415,027 B2 * 4/2013 Hayashi ................. H01R 4/029 428/599
(Continued)

FOREIGN PATENT DOCUMENTS

CN 110767453 A 2/2020
DE 102012217831 A1 * 7/2013 ......... H01R 43/0263
(Continued)

OTHER PUBLICATIONS

International Preliminary Report on Patentability for International Application No. PCT/US/2021/057344, International Filing Date Mar. 23, 2021, Date of Mailing Aug. 18, 2022, 36 pages.
(Continued)

*Primary Examiner* — Marcus E Harcum
(74) *Attorney, Agent, or Firm* — CANTOR COLBURN LLP

(57) ABSTRACT

A method for forming a connection between a busbar (1) and a contact section (20) comprising:

providing a first conductive section (11) made from aluminum, providing a second conductive section (12) made from aluminum, wherein the second conductive section (12) includes the contact section (20) or is connected to the contact section (20) and wherein the second conductive section (12) is at least partially covered with nickel and/or tin, and (Continued)

creating a laser welding bond, in particular a laser welding seam (10), between the first conductive section (11) and the second conductive section (12), by laser welding.

15 Claims, 6 Drawing Sheets

(51) Int. Cl.

| | |
|---|---|
| ***B23K 26/24*** | (2014.01) |
| ***B23K 26/322*** | (2014.01) |
| ***H01R 4/02*** | (2006.01) |
| *B23K 101/34* | (2006.01) |
| *B23K 101/38* | (2006.01) |
| *B23K 103/10* | (2006.01) |

(52) U.S. Cl.
CPC ........... *B23K 26/322* (2013.01); *H01R 4/029* (2013.01); *B23K 2101/34* (2018.08); *B23K 2101/38* (2018.08); *B23K 2103/10* (2018.08)

(58) Field of Classification Search
USPC .................................................. 439/566, 430
See application file for complete search history.

(56) References Cited

U.S. PATENT DOCUMENTS

| | | | | |
|---|---|---|---|---|
| 9,257,214 | B1 * | 2/2016 | Dailey | H02G 5/005 |
| 9,711,875 | B2 * | 7/2017 | Ooba | H01R 4/184 |
| 10,090,491 | B2 * | 10/2018 | Dewulf | H01M 50/179 |
| 11,130,196 | B2 * | 9/2021 | Newman | B23K 26/21 |
| 11,374,288 | B2 * | 6/2022 | Omura | H01M 50/507 |
| 2008/0194127 | A1 * | 8/2008 | Stracke | H01B 7/0018 174/133 R |
| 2013/0130572 | A1 * | 5/2013 | Sakae | H01R 43/00 29/874 |
| 2015/0364836 | A1 * | 12/2015 | Yagi | B23K 26/082 439/877 |
| 2017/0312853 | A1 * | 11/2017 | Kabelitz | B23K 26/323 |
| 2018/0304416 | A1 * | 10/2018 | Newman | H01M 50/516 |
| 2019/0326689 | A1 * | 10/2019 | Eiberger | H01R 43/0221 |
| 2020/0306882 | A1 * | 10/2020 | Doi | B23K 26/24 |
| 2022/0085523 | A1 * | 3/2022 | Scharkowski | H01R 43/0214 |

FOREIGN PATENT DOCUMENTS

| | | | | |
|---|---|---|---|---|
| EP | 3654742 A1 | | 5/2020 | |
| GB | 382795 A | | 11/1932 | |
| JP | 5678331 B1 | * | 3/2015 | H01R 4/58 |
| JP | 2015076153 A | | 4/2015 | |
| JP | 2016092157 A | | 5/2016 | |
| WO | WO-2020098979 A1 | * | 5/2020 | H02G 5/005 |

OTHER PUBLICATIONS

International Search Report for PCT/EP2021/057344, International Filing Date Mar. 23, 2021, Date of Mailing May 27, 2021, 14 pages.

* cited by examiner

METHOD FOR FORMING A CONNECTION BETWEEN A BUSBAR AND A CONTACT SECTION, A BUSBAR HAVING A CONTACT SECTION AND POWER DISTRIBUTION SYSTEM HAVING SUCH BUSBAR

CROSS-REFERENCE TO RELATED APPLICATIONS

This application is a National Stage filing of PCT/EP2021/057344, filed Mar. 23, 2021, which claims priority to EP 20 176 402.4, filed May 26, 2020, both of which are incorporated by reference in their entirety herein.

BACKGROUND

The present invention concerns a method for forming a connection between a busbar and a contact section, a busbar being connected to a contact section and a power distribution system having such busbar.

Laminated busbars typically comprise conductive sections of fabricated copper separated by thin dielectric materials, laminated into a unified structure. Examples for laminated busbars can be found in CN 203 504 394 U, CN 104 022 414 A1 or CN 202 474 475 U. Usually a contact section is included in the busbar, in order to connect electrical poles of an electronic component, such as a capacitor, an IGBT and even another connection busbar, directly to different conductive sections, wherein each of the conductive sections is assigned to a type of poles provided by each component. Typically, the components are connected to the connected region by nuts and bolts/pins Further, it is known, for example from U.S. Pat. No. 5,579,217, to use conductive sections made from aluminum. Thus, a comparable light busbar can be provided. For avoiding corrosion or oxidation of these busbars, the busbar is typically covered by a nickel and/or tin cladding, in particular a nickel and/or tin plating. However, covering the whole busbar with a nickel and/o tin plating is comparable cost intensive.

SUMMARY

Considering the above, it is an object of the present invention to provide a method for manufacturing a busbar and to provide a busbar that is improved compared to those known in the state of the art, in particular with respect to a cost efficiency of the manufacturing process and/or a durability of the manufactured busbar.

This object is achieved by a method to form a connection between a busbar and a contact section as described herein, a busbar being connected to a contact section as described herein, and a power distribution system having a busbar as described herein. Preferred embodiments are also described, incorporated in the claims, the description and the figures.

BRIEF DESCRIPTION OF THE DRAWINGS

Further advantages and features will be apparent from the following description of embodiments of the object according to the invention while making reference to the accompanying figures, wherein.

DETAILED DESCRIPTION

Figure 1:
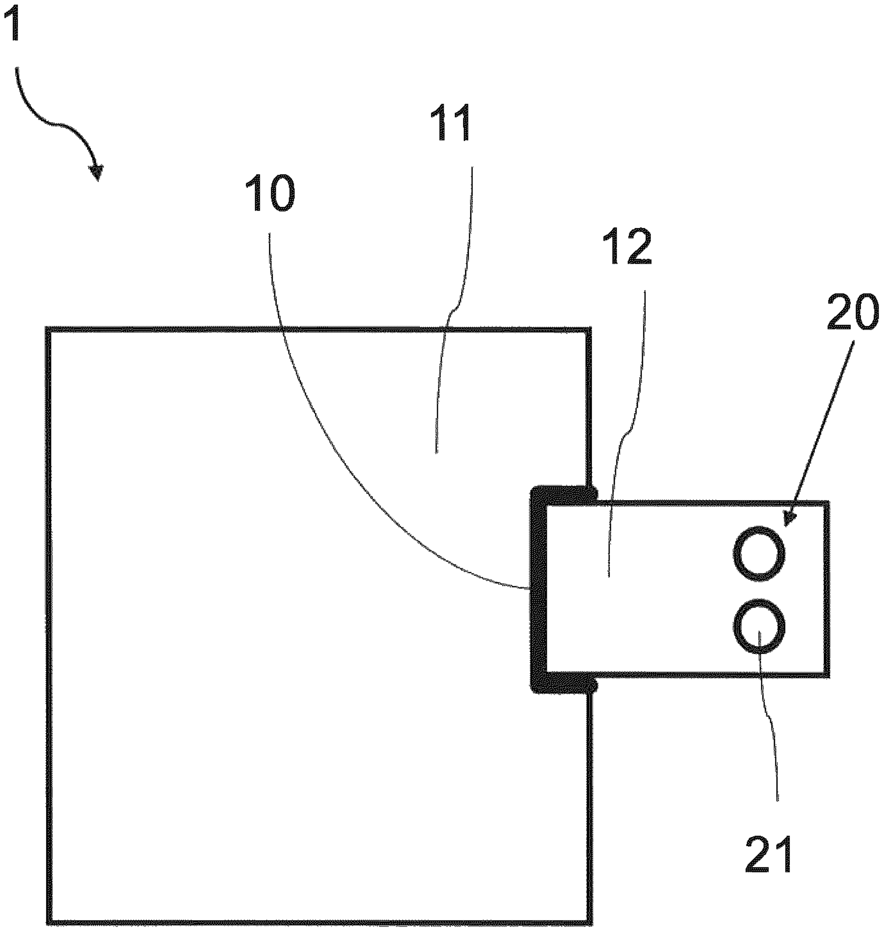
FIG. 1 schematically shows a connection between a busbar and a contact section according to a first preferred embodiment of the present invention, FIG. 2 schematically shows a connection between a busbar and a contact section according to a second preferred embodiment of the present invention, FIG. 3 schematically shows a connection between a busbar and a contact section according to a first preferred embodiment of the present invention, FIG. 4 schematically shows a connection between a busbar and a contact section according to a first preferred embodiment of the present invention, FIG. 5 schematically shows a connection between a busbar and a contact section according to a first preferred embodiment of the present invention and FIG. 6 schematically shows a connection between a busbar and a contact section according to a first preferred embodiment of the present invention.

According to a first aspect of the present invention a method for forming a connection between a busbar and a contact section is provided, comprising:

- providing a first conductive section made from aluminum,
- providing a second conductive section made from aluminum, wherein the second conductive section includes the contact section or is connected to the contact section and wherein the second conductive section is at least partially covered with nickel and/or tin and
- creating a bond, in particular a laser welding seam, i. e. a laser welding bond, between the first conductive section and the second conductive section, by laser welding.

In contrast to the state of the art, it is provided according to the present invention to connect the contact section to the first conductive section via a second conductive section being covered with nickel and/or tin and to perform the connection between the first conductive section and the second conductive section by a laser welding process. It turned out that realizing the connection by laser welding establishes a durable and resistant connection between the first conductive element and the second conductive section, in particular if the first conductive section is formed by a bare aluminum sheet and the second conductive section, being covered with nickel and/or tin, is connected directly to this bare aluminum sheet, representing the first conductive section. In particular, it turned out to be of advance to use a separate second conductive section for connecting the contact section to the first conductive section, since covering the second conductive section by nickel and/or tin can be performed in a simplified way.

Furthermore, the laser welding seam can be realized in a section, being spaced from the contact section, and therefore simplifies the access of a laser-beam to an interface region between the first conductive section and the second conducive section, the laser welding seam preferably extending at least partially along the interface region between the first and the second section in a finished state of the realized connection. As a consequence, a quality of the realized connection can be improved.

In general, it is advantageously possible to realize the nickel and/or tin cover only for the second conductive section and to avoid a covering of the first conductive section with nickel and/or tin. In other words: the durable and resistant connection realized by the laser welding allows restricting the cover only to the first conductive section and it is no longer necessary to cover the whole busbar. Thus, material, namely nickel and/or tin, can be saved and consequently the costs can be reduced, without effecting the durability of the manufactured busbar.

In particular, the contact section is defined as a section being intended to make an electrical contact available, in particular an external contact. In other words: the contacts section represents a terminal to provide the current being conducted by the busbar. For example, the contact section is configured to receive a pin or to connect a cable to the busbar to transfer an electrical current from the busbar. Furthermore, the second conductive section is preferably a part of the busbar, in particular the section without the contact section. Essentially, the first conductive section and the second conductive section form together the busbar and preferably the second conductive section continues the general course of the first conductive section in a main extension plane.

Preferably, the busbar is either a flat product extending in a main extension plane or is bended as a 3D structure, for example U-shaped or L-shaped. The first conductive section and/or the second conductive section are preferably an aluminum sheet, especially a bare aluminum sheet that mainly defines the main extension plane. For example, the contact section includes a connector element being a bushing for receiving a pin of the electrical component. Preferably, the bushing has an opening for receiving a pin of the electronical component. Thus, for mounting the electronical component the pin can be inserted into the bushing, in particular in the hole of the bushing.

Preferably, the busbar is a flat product extending in a main extension plane. The term “flat” means that a thickness of the busbar, measured in a direction perpendicular to the main extension plane, is at least 10 times, preferably at least 15 times, smaller than the extensions across the busbar in a plane parallel to the main extension plane. For instance, the busbar is laminated and/or covered with an insulation layer. Such busbars are particularly intended for collecting and transferring electrical power. For example, a plurality of capacitors is arranged on top of the busbar and are connected to the busbar for distributing a total power collected from a plurality of capacitors. Such busbars are intended for being used in electrical vehicles, for example. In particular, the thickness of the busbar, measured in a direction perpendicular to the main extension plane, is between 0.5 mm and 6 mm, more preferably between 3 mm and 6 mm and most preferably between 4.5 mm and 5.5 mm. Although the busbar is comparable thick, it is still configured to be bended to adapt its shape for the corresponding application. In particular, the term “flat” concerns a main body of the busbar, for example at least 70%, preferably at least 80% and at least 90% of the busbar extends in a flat manner. In addition to the pure flat regions or sections, the busbar can include sections extending perpendicular or slanted to a main extension plane of the busbar, thereby being U-shaped for example or L-shaped.

Preferably, the second conductive section has a non-symmetrical cross section in the main extensions plane. The non-symmetrical cross section establishes preferably a positive locking with the first conductive section, the positive locking hindering the second conductive section from being rotated about an axis perpendicular to the main extension plane. Especially, the second conductive section is not completely rotationally symmetric. For example, the second conductive section has a star like, a rectangular or an elliptical shape. Preferably, the cross section is non-circular. In particular, the second conductive section is formed such that connecting the second conductive section with the first connection section makes an orientation of the second conductive section necessary. Especially, the first conductive section and the second conductive section establish a key lock principle. Thus, it is possible to connect the first conductive section and the second conductive section prior to realizing the welding seam.

Preferably, the first conductive layer and the second conductive layer are connected by a frictional connection, in particular prior to establishing the welding seam. As a consequence, it is possible to connect the first conductive section and the second conductive section in a firm manner, for example for handling the assembly of the first conductive section and the second conductive section prior to the welding process. As a result, the assembly can be transferred to the welding machine without risking a separation of the first and the second conductive section. Preferably, the first conductive section and the second conductive section establishes a press fit.

According to another embodiment of the present invention, the welding seam along the interface section between the first conductive section and the second conductive section is interrupted or extends without an interruption.

Further, it is provided that the connector element is connected to the second conductive section such that the connector element protrudes from the second conductive section along a direction being perpendicular to the main extension plane. Especially, the connector element has a front side that faces away from the second conductive section and forms at least a part of a connection surface to which the electronical component, such as a capacitor, an IGBT, or a cable is connected. Preferably, a distance between the second conductive section and said front side facing away from the second conductive section is greater than a thickness of the first conductive section, preferably 1.2 to 5 times, more preferably 1.5 and 4 times and most preferably 2 and 3.5 times greater than the thickness of the first conductive section or second conductive section. Said distance and said thickness are measured along the direction perpendicular to the main extension plane. Preferably, the first conductive section and/or the second conductive section is covered with an isolation layer. In particular, it is provided that the connector element is covered by nickel and/or tin to realize a low contact resistance on the connector element of the contact section, in particular on a connector surface of the connector element.

According to a preferred embodiment the first conductive section and/or the second conductive section comprises several metal sheets being stacked above each other along a stacking direction extending perpendicular to the main extension plane. Preferably, the metal sheets, being stacked above each other, are isolated from each other by an isolation layer, being arranged between at least two of the several metal sheets. For example, the metal sheets have a thickness between 0.5 mm and 5 mm, preferably between 0.75 mm and 2 mm and more preferably between 1 mm and 1.5 mm, in particular measured along the stacking direction. In particular, a height of the connector element is at least 2 to 5 times, more preferably 1.5 and 4 times and most preferably 2 and 3.5 times greater than the thickness of the first conductive section, in particular measured along the stacking direction.

Preferably, it is provided that the connector element is made from aluminum. Thus, the weight of the busbar can be further decreased. In particular, the reduction of the weight is increased for such busbars having bushings as connector elements protruding from the top side of the busbar, wherein the bushing is made from aluminum, too. Alternatively, it is also conceivable to use a material different from aluminium for the connector element. In particular, it is provided that the connector element and the second conductive section are covered with tin and/or nickel, simultaneously, preferably as combined component.

Furthermore, the first conductive section and the second conductive section are preferably formed by flat bodies, extending in a main extension plane, and wherein the first conductive section and the second conductive section are arranged in a common plane, being parallel to the main extension plane. In particular, it is provided that the second conductive section continues the general course of the first conductive section in a direction parallel to the main extension plane.

Especially, a surface of the first conductive section is flush with a surface of the second conductive section, the surfaces being arranged in the same plane. As a consequence, the second conductive section represents a part of the busbar.

Moreover, it is provided that the second conductive section is smaller than the first conductive section. Preferably, an extension of the first conductive section in a direction parallel to the main extension plane is more than 5 times, preferably more than 10 times and most preferably more than 15 times greater than the extension of the second conductive section, measured in the same direction.

Preferably, the first conductive section and the second conductive section have the same thickness measured in a direction perpendicular to the main extension plane. Alternatively, it is conceivable that the thickness of the first conductive section is at least 5 times, preferably at least 10 times and most preferably at least 15 times greater than the thickness of the second conductive section. Such a comparably thin second conductive section might be easily bended to simplify the access to the contact section in specific applications. It is also conceivable that the thickness of the second conductive section is different from the thickness of the first conductive section.

In particular, the first conductive section is made from bare aluminum, i. e. an aluminium being not covered with nickel and/or tin. Thus, nickel and/or tin can be saved in the manufacturing process, since not the whole busbar, in particular the first conductive layer, is covered with nickel and/or tin. Instead only the second conductive layer forming a part of the busbar is covered with nickel and/or tin. In particular, it is provided that the first conductive layer is connected to the second conductive layer directly. It is obvious for the skilled person that the bare aluminum sheet representing the first conductive section can be covered with another material, for example by the isolation layer, without nickel and/or tin. In particular, the covering with another material does not extend to a region, which is bonded to the second conductive section. It is also conceivable that the first conductive section is partially covered with nickel and/or tin.

Preferably, the second conductive section is covered with nickel and/or tin. Thus, it is possible in an advantageous manner to establish the covering of the nickel and/or tin by a diving process and/or electrochemically. By completely covering the second conductive section, the manufacturing process of covering is simplified. At the same time by using a comparably small second conductive section, it is possible to restrict or limit the part being covered with nickel and/or tin in the finished state of the busbar.

Preferably, it is provided that in addition to the laser-welding seam, established by the laser-welding, a form-fitting between the first conductive section and the second conductive section is realized, in particular in a direction parallel to the main extension plane. As a consequence, the mechanical strength of the connection between the first conductive section and the second conductive section is increased in an advantageous manner.

Preferably, the form-fitting is realized by a first curvature, bordering at least partially the first conductive section in a plane parallel to the main extension plane, and a second curvature, bordering at least partially the second conductive section, wherein the first curvature and the second curvature are shaped complementary to each other. In particular, the first curvature and the second curvature interlock with each other to realize and/or to establish the form-fitting connection between the first conductive section and the second conductive section. Preferably, the laser-welding bond or seam is realized along the first and second curvature. Thereby, it is conceivable that the modification of the first or second curvature, intended to realize the form-fitting, might be established in a direction parallel to the main extension plane and/or perpendicular to the main extension plane.

Furthermore, a laser-welding seam, in particular a single laser-welding seam, is generated

- by directing a laser beam on a top surface of the first conductive section or of the busbar, and optionally by directing another laser beam on a bottom surface of a first conductive section or of the busbar or
- several laser-welding seems are generated by directing a laser beam on the top surface of the busbar or the first conductive section and by directing another laser beam on a bottom surface of the first conductive section or of the busbar. By treating the interface region between the first conductive section and the second conductive section from both sides, i.e. at the topside and the bottom side of the busbar, it is advantageously possible to increase the welding strengths and therefore the mechanical strengths of the bond between the first conductive section and the second conductive section. In particular, the method includes also an embodiment, which uses only a single laser, wherein the laser beam is split into two different laser beams, wherein one laser beam is directed to the top surface and the other laser beam is directed to the bottom surface of the interface region between the first conductive section and the second conductive section. By directing laser light onto the topside and the bottom side of the busbar or the interface section it is further advantageously possible to accelerate the bonding process, since the laser welding seam is generated simultaneously from both side, namely from the top side and the bottom side.

Preferably, the contact section includes an opening, in particular for inserting a corresponding pin or terminal. Thus, the opening allows connecting the contact section and therefore the busbar to an external component, such as a terminal of a capacitor, IGBT and/or a cable that transfers the electric current from the busbar to a device, which needs the current. Especially, capacitors are connected with the busbar by terminals, using bolts and nuts, for example. Preferably, the laser-welding bond is spaced from the contact section. As a consequence, the laser process is simplified, since the access to the interface section between the first conductive section and the second conductive section is improved.

In particular, the second conductive section is inserted into a recess of the first conductive section. As a consequence, a contact section can be incorporated inside or within the first conductive section or, in other words, in the middle of the busbar. For example, the recess represents a hole that reaches through the whole first conductive section. Alternatively, it is also thinkable that the recess has a stepped shape and the second conductive section is inserted into the step-shaped recess formed in the first conductive section.

Preferably, the second conductive layer is arranged adjacent to the first conductive section. As a consequence, it is possible to realize a terminal at the outside or at the outer edge of the first conductive section by connecting such a second conductive section to the outer edge or outer rim of the first conductive section.

In particular, it is provided that a nickel plating and/or a tin plating is provided to cover the second conductive section is performed, wherein the nickel plating and/or the tin plating has a thickness between 1 μm and 50 μm, preferably between 2 and 25 μm and more preferably between 5 and 15 μm. It turned out that for said thicknesses an effective corrosion and oxidation protection can be realized, without spending too much nickel and/or tin for realizing said protection.

Preferably, a laser power is adjusted for defining a length of the laser welding seam. Thus, it is advantageously possible to control the strength and dimensions of the generated laser welding seam. Alternatively or additionally, it is conceivable to adjust a treatment duration, during which the laser welding seam is generated, for adapting the dimensions and/or the form of the generated laser welding seam.

Another aspect of the present invention concerns a busbar having a contact section, in particular realized by a method according to the present invention, comprising a first conductive section made from aluminum;

a second conductive section made from aluminum, wherein the second conductive section includes the contact section or is connected to the contact section and wherein the second conductive section is at least partially covered with nickel and/or tin, and a laser welding bond connecting the first conductive section and the second conductive section. All specifics being mentioned in the context of method according to the present invention apply analogously to the busbar being connected to the contact section and therefore having the contact section.

Another aspect of the present invention concerns a power distribution system having a busbar according to the present invention. All specifics and benefits being mentioned above apply analogously to the subject matter of the power distribution system and vice versa. An example for such a power distribution system is a battery package or components being used in electrical vehicles, hybrid vehicles, rail vehicles and for generating or handling renewable energy.

Wherever not already described explicitly, individual embodiments or their individual aspects and features can be combined or exchanged with one another without limiting or widening the scope of the described invention, whenever such a combination or exchange is meaningful and in the sense of this invention. Advantages which are described with respect to one embodiment of the present invention are, wherever applicable, also advantageous of other embodiments of the present invention.

In FIG. 1 a busbar 1, being connected to a contact section 20 according to a first exemplary embodiment of the present invention is illustrated. Preferably, such busbars 1 are used to collect and to transfer comparably high currents, preferably in a power distribution system. For example, such power distribution system and/or the connection of the busbar is used in an electro-motoric driven vehicle, electric locomotive or power transmission system. The contact section 20 is intended to allow a contact to an external component, in particular, to transfer a current from the busbar 1 to a cable. Preferably, the contact section 20 forms a terminal. For example, the contact section 20 includes at least one opening 21 for connection terminals (not illustrated).

To provide a comparably light busbar 1 it is preferably provided to use aluminium as material for the busbar 1. However, using aluminium as material for the busbar 1 makes a corrosion protection necessary to avoid a corrosion of the busbar 1. In particular, it is known to use nickel and/or tin for covering the busbar 1 for providing the desired corrosion protection. However, covering the whole busbar 1 with nickel and/or tin, in particular, performing a nickel and/or tin plating of the aluminium busbar 1 is a material- and cost-intensive way to create the corrosion protection of the busbar 1.

Especially, it turned out that it is sufficient for the corrosion protection, if the covering of the busbar 1 with nickel and/or tin is established in the near of the contact section 20 and/or in the contact section 20, since this region is receptive for corrosion. Therefore, it is reasonable to create or to establish the covering only partially at the busbar 1, in particular in a region being closed or next to the contact section 20 and/or in the contact section 20. However, covering the busbar 1 only partially with nickel and/or tin leads to challenges in manufacturing, which has to be overcome. It turned out that it is an advantageous way to realize in a simple and effective manner the partial covering of the bus bar with nickel and/or tin by using a first conductive section 11 and a second conductive section 12, the second conductive section 12 including the contact section 20 and/or is connected to the contact zone 20. Thereby, the second conductive section 12 forms a part of the busbar 1 in a finished state of the connection between the contact section 20 and the busbar 1. In particular, it is provided to use a flat body, mainly extending along a main extension plane HSE as a second conductive element 12 in order to continue the general cause of the first conductive layer 11 for forming a flat or laminated busbar 1. Furthermore, it turned out to be beneficial to use a laser-welding process to perform a bonding and/or to establish a connection between the first conductive section 11 and the second conductive section 12. In the embodiment illustrated in FIG. 1, the second conductive section 12 forms a lug protruding from an outer edge of the first conductive section 11. It is also conceivable that the second conductive section 12 is at least partially inserted into a recess being formed at the outer edge of the first conductive section 11 of the busbar 1. As a consequence, a contact surface, i.e., an interface section, between the first conductive section 11 and the second conductive section 12 is increased to strengthen the connection or bond between the first conductive section 11 and the second conductive section 12.

Figure 2:
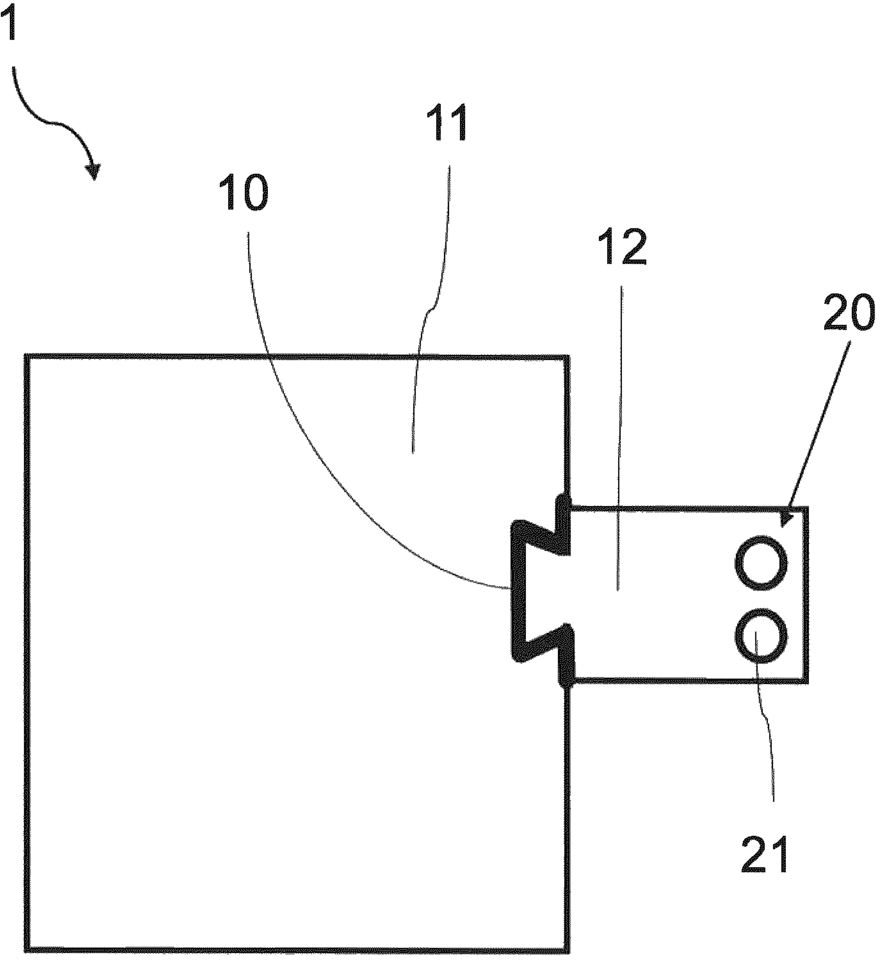

In FIG. 2 a busbar 1 connected to a contact section 20 is illustrated according to a second exemplary embodiment of the present invention. In general, the embodiment illustrated in FIG. 2 differs from the embodiment illustrated in FIG. 1 by using a form-fitting interaction between the first conductive section 11 and the second conductive section 12 in addition to the bond realized by the laser welding seam 10. For establishing the form-fitting connection between the first conductive section 11 and the second conductive section 12, in particular in a direction perpendicular to the outer edge of the first conductive section 11 and parallel to the main extension plane HSE, the first conductive section 11 has a first contour and the second conductive section 12 has a second contour, the first conductive contour and the second contour having a complementary shape, in order to be connected with each other in a form-fitting manner, in particular in a direction parallel to the main extension plane HSE. Preferably, the first conductive section 11 and second conductive section 12 are connected by a dovetail-joint. As a consequence, the mechanical strength and connection between the first conductive section 11 and the second conductive section 12 is improved.

Figure 3:
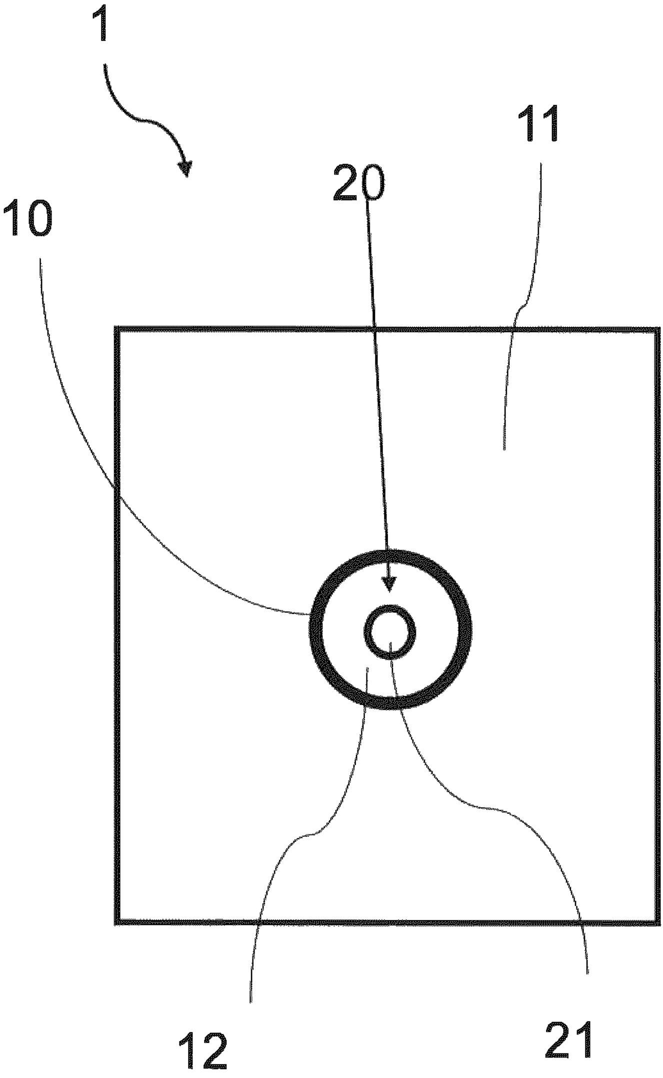

In FIG. 3 a busbar 1 being connected to a contact section 20 is illustrated according to a third preferred embodiment of the present invention. The embodiment illustrated in FIG. 3 differs from the embodiment illustrated in the FIGS. 1 and 2 mainly by the arrangement of the second conductive section 12. While in the embodiments illustrated in the FIGS. 1 and 2, the second conductive section 12 being located adjacent to the first conductive section 11, the second conductive section 12 in the embodiment illustrated in FIG. 3 is located inside of the first conductive section 11. In particular, the second conductive section 12 is inserted into a corresponding recess being formed in the first conductive section 11. For example, the first conductive section 11 has a round recess or hole, which allows inserting a correspondingly shaped second conductive section 12 into the recess. In particular, it is provided for all embodiments, in particular those, which are disclosed or illustrated in the FIGS. 1 to 3 such that the location of the welding seam 10 is spaced from the contact section 20, preferably more than 1 mm, more preferably more than 10 mm and most preferably more than 100 mm. This simplifies the manufacturing process, because the region, which has to be treated by the laser-light for forming the laser-welding bond or seam 10 has an easier access to an interface section between the first conductive section 11 and the second conductive section 12, in particular, compared to a situation, in which the contact section 20 is directly connected to the busbar 1, i.e the first conductive section 11. This is another benefit of using the second conductive section 12 as an intermediate element between the first conductive section 12, i.e. the main part of the busbar 1, and the contact section 20.

Figure 4:
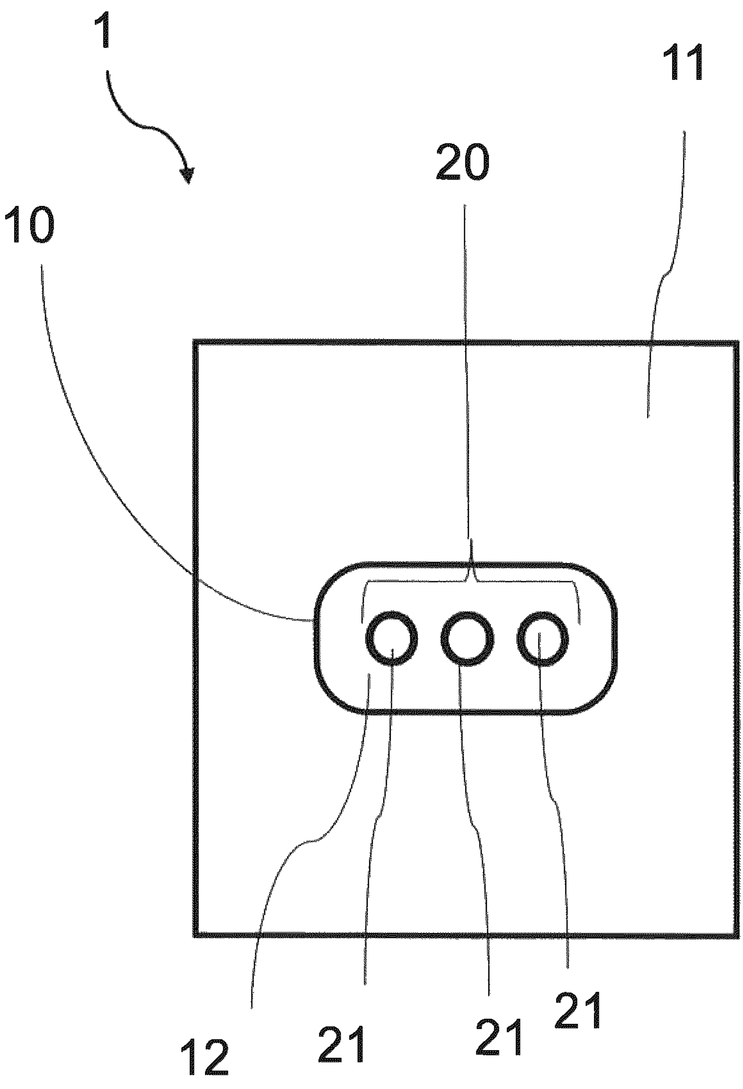

In FIG. 4, a busbar 1 connected to the contact section 20 is illustrated according to a fourth preferred embodiment. The embodiment illustrated in FIG. 4 differs from the embodiment illustrated in FIG. 3 mainly by the shape and design of the contact section 20 and/or the second conductive section 12. In particular, it is provided that the contact section 20 in FIG. 4 has three openings 21 being located in a row. As a consequence, the contact section 20 is no longer formed circular or round and instead has an elongated shape, in particular along a direction being defined by the row of the openings 21.

Figure 5:
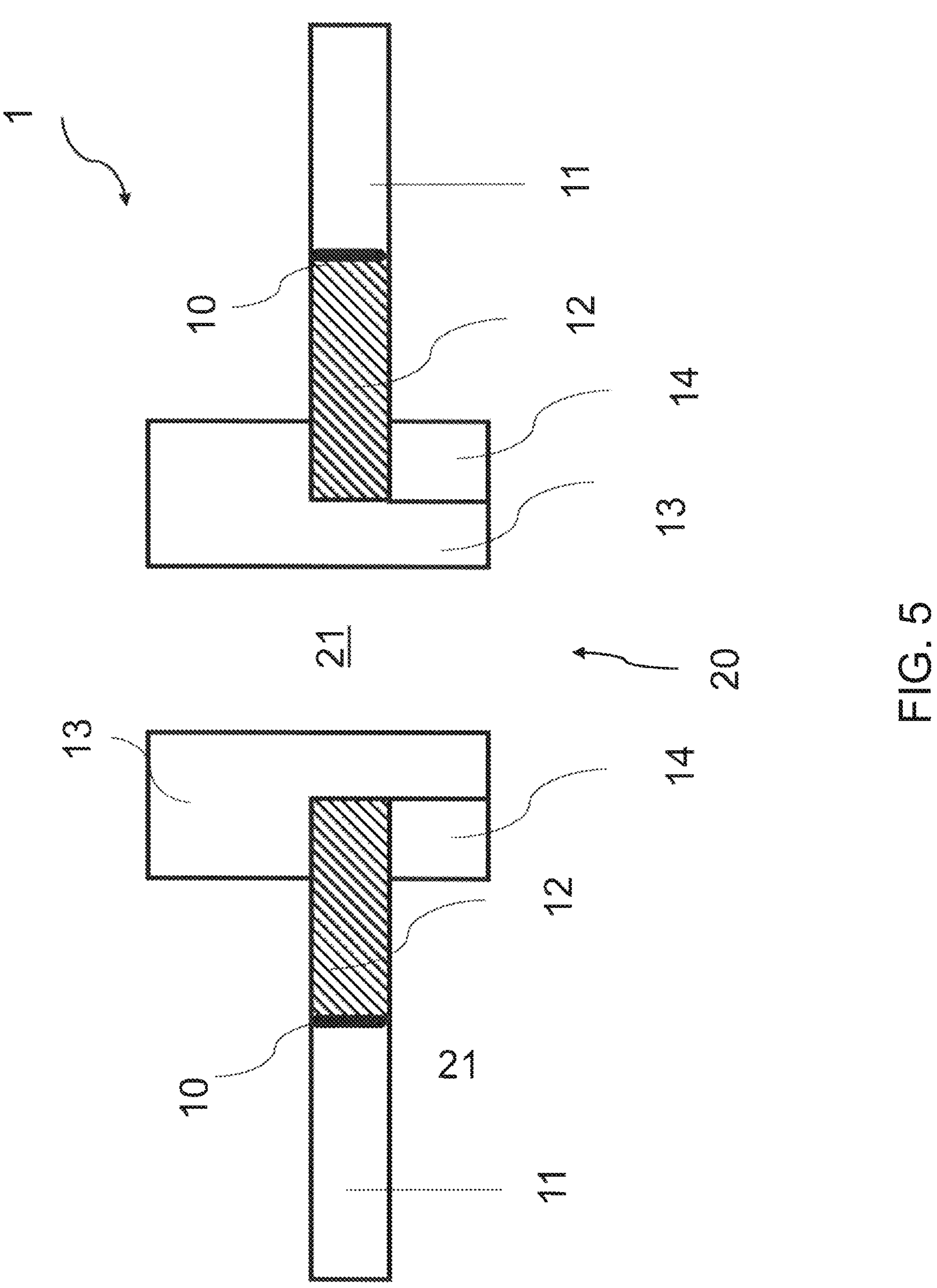

In FIG. 5 a busbar 1 being connected to a contact section 20 is illustrated according to a fifth exemplary embodiment of the present invention. In particular, the embodiment illustrated in FIG. 5 refers to an embodiment having a connector element 13, 14, which establishes the contact section 20 being connected to the busbar 1. In particular, the contact section 20 is formed as a bushing, i.e. as a cylindrical shaped body that protrudes from the busbar 1 in a direction being perpendicular to the main extension plane HSE of the busbar 1. Such a bushing or cylindrical shaped connector element 13, 14 has an opening 21 for receiving a pin, for example a pin of a capacitor, which is connected to the busbar 1. As illustrated in FIG. 5, the bushing or the cylindrically shaped body might have a first part 13 and a second part 14, wherein the first part 13 reaches through a hole or recess inside the second conductive section 12 and in particular reaches through this hole or recess for being connected with the second part 14 in order to fix the bushing or the cylindrical shaped connector element 13, 14 to the busbar 1 in a form-fitting way, preferably in a direction being perpendicular to the main extension plane HSE. Preferably, the bushing is connected to the second conductive layer 12 also by a laser-welding or they, i.e. the second conductive section and the connector element, form a single or monolithic body. It is also conceivable that the bushing is made from aluminium and/or is covered with nickel and/or tin.

Figure 6:
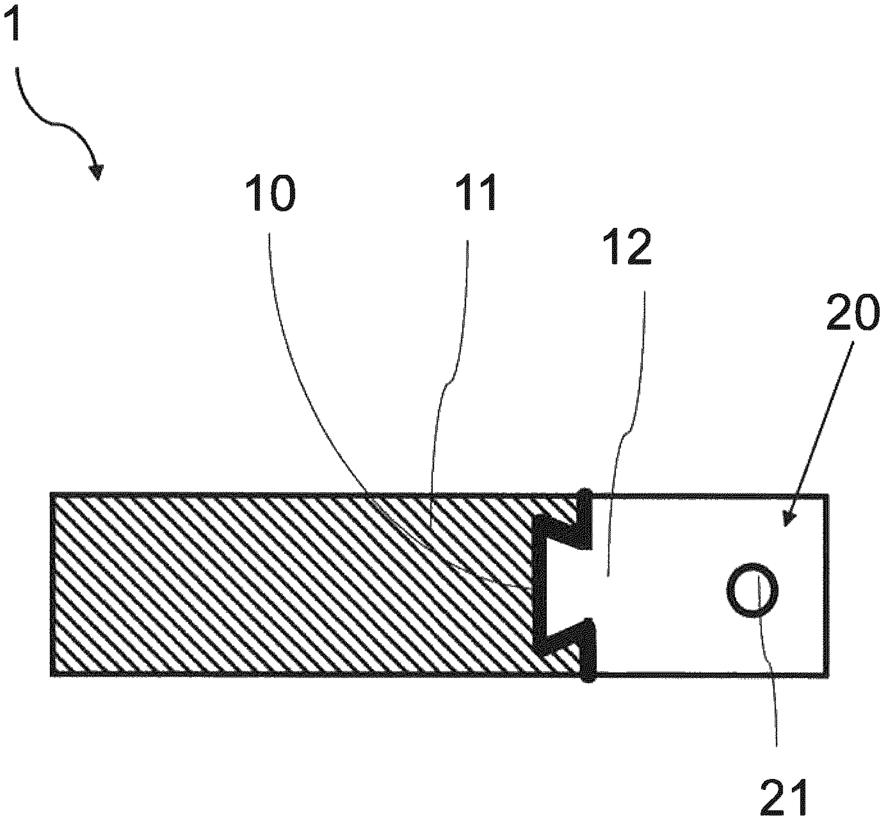

FIG. 6 shows a connection between a busbar 1 and a contact section 20 according to a sixth preferred embodiment of the present invention. In particular, it is provided that this embodiment refers to a busbar 1 has a stripe-like shape. In particular, it is provided that the first conductive section 11 and the second conductive section 12 have the same width measured in a direction of a general course of the interface section between the first conductive section 11 and the second conductive section or mainly parallel to the direction along which the laser welding seams 10 extends. The shape of the first contour of the first conductive section 11 and the second contour of the second conductive section 12 corresponds to the one, which has been discussed in FIG. 2.

REFERENCE NUMBERS

1 busbar
10 seam
11 first conductive section
12 second conductive section
13 first part
14 second part
20 contact section
21 opening

The invention claimed is:

1. A method for forming a connection between a busbar (1) and a contact section (20) comprising:

providing a first conductive section (11) made from aluminum, the first conductive section (11) being a bare aluminum sheet, providing a second conductive section (12) made from aluminum, wherein the second conductive section (12) includes the contact section (20) and wherein the second conductive section (12) is at least partially covered with nickel and/or tin, wherein the first conductive section (11) and the second conductive section (12) are formed by flat bodies, extending in a main extension plane, and wherein the first conductive section (11) and the second conductive section (12) are arranged in a common plane, being parallel to the main extension plane, and creating a laser welding bond (10), between the first conductive section (11) and the second conductive section (12), by laser welding, wherein the laser welding bond connects the first conductive section (11) and the second conductive section (12), which is covered by nickel and/or tin, wherein the second conductive section (12) has a non-circular cross section in the main extension plane, wherein the first conductive section is flush with a surface of the second conductive section, the surface being arranged in the same plane, and wherein the first conductive section and the second conductive section have the same thickness measured in a direction perpendicular to the main extension plane.

2. The method according to claim 1, wherein in addition to the laser welding bond a form-fitting is realized between the first conductive section (11) and the second conductive section (12).

3. The method according to claim 2, wherein the form-fitting is in a direction parallel to the main extension plane.

4. The method according to claim 2, wherein the form fitting is realized by a first curvature, bordering at least partially the first conductive section (11) in a plane parallel to the main extension plane, and a second curvature, bordering at least partially the second conductive section (12), wherein the first curvature and the second curvature are shaped complementary to each other.

5. The method according to claim 1, wherein the laser welding bond (10) is a laser welding seam.

6. The method according to claim 5, wherein the laser welding seam (10) is generated by directing a laser beam on a top surface of the first conductive section (11), or more than one laser welding seams (10) are generated by directing a laser beam on the top surface of the first conductive section (11) and by directing another laser beam on a bottom surface of the first conductive section (11).

7. The method according to claim 5, wherein the laser welding bond (10) is spaced from the contact section (20).

8. The method according to claim 1, wherein the contact section (20) includes an opening (21).

9. The method according to claim 8, wherein the opening is configured to insert a corresponding terminal.

10. The method according to claim 1, wherein the second conductive section (12) is inserted into a recess of the first conductive section (11).

11. The method according to claim 1, wherein the second conductive section (12) is adjacent to the first conductive section (11).

12. The method according to claim 1, wherein a nickel plating and/or a tin plating is provided to cover the second conductive section (12), wherein the nickel plating and/or the tin plating has a thickness between 1 μm and 50 μm.

13. A busbar (1) having a contact section (20), comprising a first conductive section (11) comprising aluminum, the first conductive section (11) being a bare aluminum sheet, a second conductive section (12) comprising aluminum, wherein the second conductive section (12) includes the contact section (20) or is connected to the contact section (20), wherein the second conductive section (12) is at least partially covered with nickel and/or tin, wherein the first conductive section (11) and the second conductive section (12) are formed by flat bodies, extending in a main extension plane, and wherein the first conductive section (11) and the second conductive section (12) are arranged in a common plane, being parallel to the main extension plane and a laser welding bond (10) connecting the first conductive section (11) and the second conductive section (12), wherein the laser bond connects the first conductive section (11) and the second conductive section (12), which is covered by nickel and/or tin, and wherein the second conductive section (12) has a non-circular cross section in the main extension plane, wherein the first conductive section is flush with a surface of the second conductive section, the surface being arranged in the same plane, and wherein the first conductive section and the second conductive section have the same thickness measured in a direction perpendicular to the main extension plane.

14. A power distribution system having a busbar (1) according to claim 13.

15. A method for forming a connection between a busbar (1) and a contact section (20) comprising:

providing a first conductive section (11) made from aluminum, the first conductive section (11) being a bare aluminum sheet, providing a second conductive section (12) made from aluminum, wherein the second conductive section (12) includes the contact section (20) or is connected to the contact section (20) and wherein the second conductive section (12) is at least partially covered with nickel and/or tin, wherein the first conductive section (11) and the second conductive section (12) are formed by flat bodies, extending in a main extension plane, and wherein the first conductive section (11) and the second conductive section (12) are arranged in a common plane, being parallel to the main extension plane, and creating a laser welding bond (10), between the first conductive section (11) and the second conductive section (12), by laser welding, wherein the laser welding bond connects the first conductive section (11) and the second conductive section (12), which is covered by nickel and/or tin, wherein the second conductive section (12) has a non-circular cross section in the main extension plane, wherein the laser welding bond (10) is a laser welding seam, and wherein the laser welding seam (10) is a single laser welding seam (10) generated by directing a laser beam on a top surface of the first conductive section (11) and by directing another laser beam on a bottom surface of the first conductive section (12).

* * * * *